June 20, 1967  M. LEVINE  3,326,490

FILM SPOOL LOADING MEANS

Filed Dec. 28, 1965

INVENTOR.
MARVIN LEVINE
BY
James P. Malone

| United States Patent Office | 3,326,490
Patented June 20, 1967 |
|---|---|

3,326,490
FILM SPOOL LOADING MEANS
Marvin Levine, Carle Place, N.Y. assignor to
OPTOmechanisms, Inc., Plainview, N.Y.
Filed Dec. 28, 1965, Ser. No. 516,984
3 Claims. (Cl. 242—71)

This invention relates to spool loading means for apparatus such as film viewers, projectors, cameras, and other film loading apparatus.

Film spool loading devices of the prior art are generally complicated and difficult to use, especially when loading large spools. This generally results in delay and possibly damaging the film, or the apparatus. The present invention provides a very efficient and reliable means for loading a film spool wherein the spool and shaft are simply dropped into position.

Accordingly, a principal object of the invention is to provide new and improved film spool loading means.

Another object of the invention is to provide new and improved film spool loading means wherein the spool and shaft are simply dropped into position.

Another object of the invention is to provide new and improved film spool loading means having means to locate the spool on the spool shaft.

These and other objects of the invention will be apparent from the following specification and drawings of which:

Figure 1:
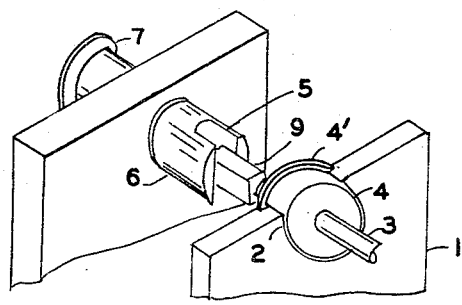
FIGURE 1 is a perspective view of the embodiment of the invention.
Figure 3:
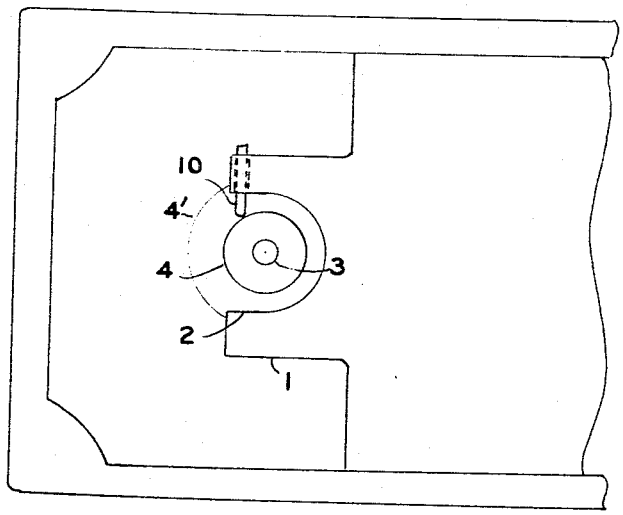
FIGURE 3 is a side view of FIGURE 2.
Figure 2:
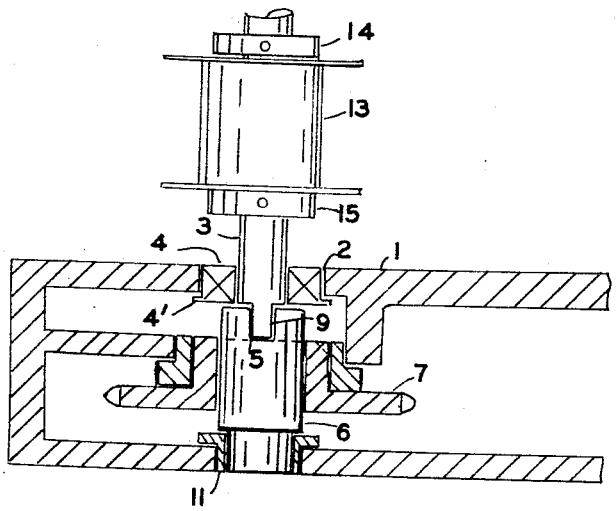
FIGURE 2 is a top view of the embodiment of the invention partly in section.

Referring to the figures, the invention generally comprises a frame member 1 having a slot aperture 2. The film spool shaft 3 has a flanged ball bearing 4 which is adapted to be dropped into the slot 2. The bearing is restrained on the shaft from axial movement by the flange 4' on the shaft which together with a similar bearing on the other end of the shaft, which is not shown, will accurately locate the spool shaft.

The shaft 3 has a rectangular projection 9 on its end, which is adapted to engage a slot 5 in the drive member 6 which is rotatably mounted in the frame member 1. The drive member 6 is connected to a drive knob or gear 7 for the purpose of rotating the spool shaft. The spool shaft is loaded by simply dropping the shaft bearing 4 with flange 4', into the slot 2 and the projection 9 into the slot 5. It is necessary to line up the drive member 6 and the slot 5 previous to doing this. If the device is to be used in horizontal position, there is no further locking necessary. If the device is not to be used horizontally, then the bearing 4 is preferably locked into the frame member 1 by means of the spring plunger 10.

The drive member 6 is mounted in the frame 1 by means of bearing 11. The drive member 6 may have a manual knob or gear 7 for the purpose of turning the shaft. The drive member 6 has a slot 5 which is adapted to receive the projection 9 of the shaft 3.

There is a similar bearing and slot on the other side of the shaft corresponding to aperture 2 and bearing 4 which are not shown. However, there is no drive member on the other side.

The spool 13 may be fixed to the shaft by locking the clamping collars 14 and 15 which may be secured by set screws.

In operation, the spool is first mounted on the shaft and then the spool shaft assembly is dropped into the slotted frame member first lining up the drive member slot. If the utilization apparatus operates in a horizontal plane, then the weight of the spool will keep it in position. However, if the utilization apparatus is movable or portable, it may be preferable that the bearing 4 be locked into place in the frame 1.

Therefore, the present invention provides a simple, reliable, efficient and quick loading means for mounting film spools in viewers and other utilization apparatus.

Many modifications may be made by those who desire to practice the invention without departing from the scope thereof which is defined by the following claims:

I claim:
1. A film spool loading means comprising,
    a shaft adapted to mount a spool, said shaft having a projection at one end of a rectangular cross-section,
    a flanged bearing mounted on said shaft a predetermined distance from said projection,
    a frame member having an aperture slot adapted to receive said bearing,
    a drive member rotatably mounted in said frame, said drive member having a slot adapted to receive said projection on said shaft, whereby said spool shaft may be mounted by dropping said bearing in said bearing slot and said projection into said drive member slot.
2. Apparatus as in claim 1 having means to position and fix a spool to said shaft.
3. Apparatus as in claim 1 having means to lock said shaft bearing into said frame slot.

References Cited
UNITED STATES PATENTS

| 1,817,134 | 8/1931 | Eighmey | 242—71 |
| 2,238,191 | 4/1941 | Shelton | 242—71 |

FRANK J. COHEN, *Primary Examiner.*

N. L. MINTZ, *Assistant Examiner.*